United States Patent [19]

Cook et al.

[11] 3,905,684

[45] Sept. 16, 1975

[54] OPTICAL BEAM SPLITTING SYSTEM

[75] Inventors: Gordon Henry Cook; John Anthony Fawcett, both of Leicester, England

[73] Assignee: The Rank Organisation Limited, London, England

[22] Filed: Sept. 19, 1973

[21] Appl. No.: 398,706

[30] Foreign Application Priority Data

Sept. 19, 1972 United Kingdom............... 43280/72

[52] U.S. Cl. .................... 350/173; 350/171; 358/55
[51] Int. Cl.² ...................... G02B 27/10; H04N 9/09
[58] Field of Search.......... 350/171, 173; 178/5.4 E, 178/5.4 TC

[56] References Cited
UNITED STATES PATENTS

| | | | |
|---|---|---|---|
| 3,590,145 | 6/1971 | Schneider et al. | 350/173 X |
| 3,610,818 | 10/1971 | Bachmann | 350/173 X |
| 3,653,748 | 4/1972 | Athey | 350/171 |
| 3,718,752 | 2/1973 | Katsuta et al. | 350/173 X |
| 3,739,080 | 6/1973 | Bachmann | 350/173 X |

*Primary Examiner*—David H. Rubin
*Attorney, Agent, or Firm*—Brisebois & Kruger

[57] ABSTRACT

A selective beam splitting arrangement having a plurality of reflective and/or transmissive surfaces for separating incident image-forming light into a number of components to provide more than one image also includes a plurality of additional light sources to provide bias illumination of the image planes. The light from the sources is directed to the image planes by at least some of the same surfaces of the beam splitting arrangement which separate the incident light, at least one of the surfaces being geometrically or spectrally incapable of illuminating all the image planes. The optical axis of the light from each source meets a surface of the beam splitting arrangement in a direction which is substantially a mirror image of the optical axis of the incident light.

7 Claims, 9 Drawing Figures

OPTICAL BEAM SPLITTING SYSTEM

The invention relates to an optical system comprising a selective beam-splitting arrangement in which incident image forming light emanating from a focussing system is split to yield more than one image.

It is often desirable and necessary to provide a secondary low level of illumination in each image plane which is independent of the brightness of the image formed by the focussing system or the light distribution within the scene being viewed.

In television, for example, some of the characteristics of the image receptor tubes that are prevalently used are such that there is a lag or smear trailing behind the reproduction of bright moving objects in the field of view and this often reaches troublesome proportions. More particularly, in colour television the subjective effects become more serious if this lag is coloured instead of being neutral.

It is well-known, for example in U.K. Specification No. 1,227,869, that the lag described can be reduced significantly by using secondary illumination in all the image planes in conjunction with appropriate external electronic circuitry. Conventionally, this secondary illumination is termed "bias lighting".

The bias lighting can be inserted into the complete system in a number of ways. Its source can be incorporated in the focussing system, in the beam-splitting arrangement or within each image receptor tube. Incorporation of the bias lighting in the focussing system presents a number of difficulties because the bias light then follows the same paths through the beam-splitting arrangements as the image forming light and there is thus no separate control for providing differential levels of bias light illumination between the image planes. Furthermore, when the focussing system is complex in nature, for example a zoom lens, such incorporation is liable to impair its performance or introduce practical difficulties.

Provision of bias lighting within each image receptor tube provides differential illumination control but it is difficult to achieve in a practicable manner, has an expensive replacement factor, and in its simplest form suffers from lack of uniformity of illumination of the scanned image surface.

This invention is therefore concerned with the preferred provision of bias lighting within the beam splitting arrangement.

Known arrangements of this type suffer from a number of serious defects. In one known arrangement one or more light sources emit light which is scattered and reflected through the beam-splitting arrangement in a random manner from glass and metal components within the camera and within the focussing system used with it. It is clear that this provides inadequate control of bias light level, its uniformity, and differential illumination between the separate image planes. The light source is necessarily small with low power consumption and takes the form of a tungsten filament. To ensure long life the lamp is run at a voltage lower than its rating and when this voltage is used to control bias light level there is considerable variation of lamp colour temperature which significantly affects the differential level of illumination reaching the image planes along colour selective paths.

In another known arrangement the beam-splitting arrangement is of the prismatic type and entrance apertures are provided in or near surfaces which are parallel to the splitting plane and otherwise normally grey or unpolished. These permit bias lighting to be inserted along a very oblique path to reach all the image planes. The obliqueness of one of these paths is too great to provide the necessary uniformity of bias lighting and the difficulty is not completely overcome by the use of a plurality of such paths. The bias lighting traverses the various surfaces of the beam-splitting arrangement in the same sequence as the image forming light and this known arrangement therefore suffers from the same disadvantages as mentioned above. Furthermore, the obliqueness of these paths are often such that the optical conditions under which the beam-splitting surfaces operate do not apply to the direction of the bias lighting. For example compound angles of incidence at air gaps requiring to be both transmissive and reflective may not fulfil the laws of critical angle of reflection. Avoidance of such conditions introduces other difficulties which make this second known arrangement as unattractive as the first.

All known arrangements suffer from the disadvantage that it is extremely difficult to achieve a predetermined ratio of uniform bias illumination between the more critical red and blue channels at any required level for both.

It is required, therefore, to provide as far as possible a beam-splitting arrangement which operates without impairment of its selective image forming function whilst at the same time provides bias lighting with high uniformity of bias illumination in all channels, a wide range of adjustment of bias illumination levels, and a wide range of adjustment of differential illumination between channels.

According to the present invention there is provided an optical system comprising a selective beam-splitting arrangement for separating incident image-forming light into a plurality of components to provide more than one image, and a plurality of bias light sources from which bias illumination is directed to the image planes by reflective and/or transmissive surfaces of the beam-splitting arrangement which are also used in separating the incident light, wherein at least one of the sources is geometrically or spectrally incapable of illuminating all the image planes, and wherein the optical axis of the light from each source meets a said surface of the beam splitting arrangement in a direction which is substantially a mirror image of the optical axis of the incident image forming light.

High uniformity of illumination is achieved by considering the surfaces in the beam-splitting arrangement which split selectively the image forming light by reason of their various modes of use, i.e. reflective and/or transmissive. By using these same surfaces, if necessary in different combinations and modes, it is possible to find a position for each bias light source which will not obstruct the image forming beams and where the bias light can be directed into the beam-splitting arrangement along an optical axis which, at least where it meets a surface of the beam-splitting arrangement, is a mirror image of the optical axis of the incident image-forming light. As is shown later, adequate uniformity of illumination is achieved when the equivalent air distance between the source and the image plane or planes is typically greater than three times the diagonal of the image format.

A wide range of adjustment of bias illumination levels is achieved by using more than one light source. At least one light source is restricted, preferably by the manner in which the combination and modes of the internal surfaces are used, to illuminate less than the total number of image planes provided by the beam-splitting arrangement. For example, if three image planes are provided, one light source will only illuminate one or two of the three planes. Since the required level of bias light illumination is extremely small, miniature low voltage lamps are more than adequate for the purpose and at their rated voltage emit considerably more light than is required for the purpose. If one lamp only illuminates one image plane with light contained within only one narrow band of the spectrum, it will be apparent that a voltage control can yield bias illumination levels ranging from much more than what is required to almost negligible levels because change of source colour temperature is not effective over the narrow spectral band.

Similarly, if one lamp illuminates two image planes with light differing spectrally in each and if these two spectral regions are adjacent within the spectrum, the effects of variation of light source colour temperature over the restricted spectral range covered by these two channels remain within acceptable limits. In this latter example, two of the three images receive bias illumination which is independently adjustable to the required level and differential or match whilst the bias illumination on the third image remains within an acceptable level relative to the other two.

Furthermore, the use of more than one bias light source with one source illuminating less than all of the images provides the required ability to adjust the differential illumination between channels.

In considering the above it is important to appreciate that the bias illumination falling on any one image plane does not have to match the spectra characteristics of the image forming light in that channel; it merely has to have spectral characteristics to which that receptor is sensitive.

Embodiments of the invention will now be described, by way of example, with reference to the accompanying drawings, in which:

FIG. 1b beam-splitting the principles of the invention as applied to a beam-spitting system of the type shown in FIG. 1a;

FIG. 2a shows a practical prismatic beam-splitting system of a known type, while

Figure 1A:
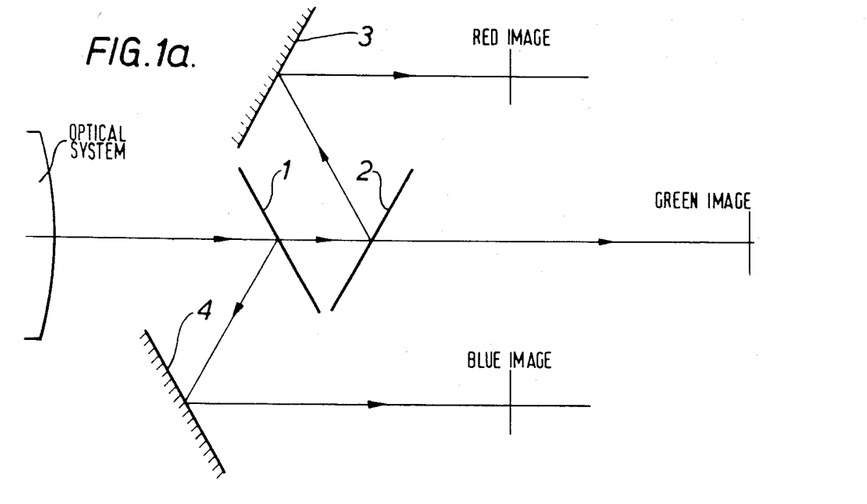
FIG. 1a illustrates in a general manner known beam-splitting systems.

FIG. 1a shows rather diagrammatically a beam-splitting system of selective mirror surfaces splitting the image forming light emanating from the optical system to form three separate images red, green and blue. Mirrors 1 and 2 are colour selective reflector/transmitter mirrors. Mirrors 3 and 4 are simple fully reflective mirrors to position the image planes in practical and convenient positions. For the sake of clarity only the optical axes of the image forming light is shown and it will be obvious how such an arrangement can transmit cones of finite aperture light to all points in the image field.

Figure 1B:
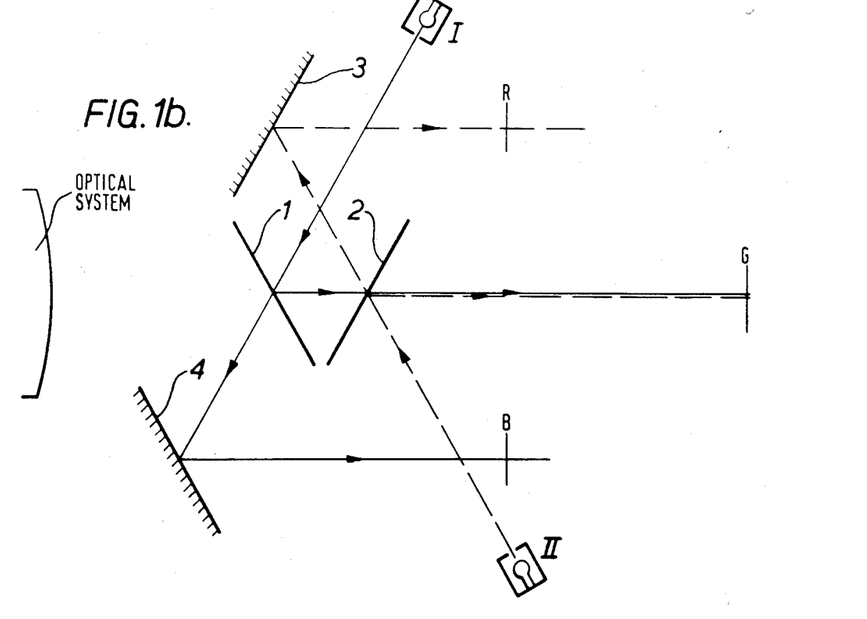

FIG. 1b shows the optical axes of the bias lighting which can be superimposed on the system of FIG. 1a without impairment of the paths indicated in FIG. 1a.

This arrangement is not ideal in respect of the behaviour of the colour selective beam-splitting or the manner in which the bias lighting operates but it serves to illustrate the basic conception of the invention.

Light from a source I, which is located on an axis which is a mirror image in the mirror 1 of the optical axis of the image-forming light, is suitably masked in a directional sense and falls on the blue reflective mirror 1 which will transmit minus blue light, i.e. red and green to the blue image plane B. The blue bias light reflected at mirror 1 will not be reflected by the red reflective mirror 2 to reach the red image plane R but will be transmitted by this surface to reach the green image plane G.

Light from a source II, which is located on an axis which is a mirror image in the mirror 2 of the optical axis of the image-forming light, falls on the red reflective mirror 2 which will transmit blue and green light to the red image plane R. The red bias light reflected at mirror 2 will reach the green image plane G.

The bias lighting on each image plane is thus constituted as follows:

Blue image plane - red and green from source I only
Green image plane - blue and red from source I and II
Red image plane - blue and green from source II only It is apparent that any relationship that is required between bias illumination levels in the red and blue image planes can be provided by simple voltage adjustment of lamps I and II without necessity to pay any regard to the resultant change in their colour temperature. The bias level in the green image plane will usefully tend to be of the same order as those in other channels at least to an acceptable degree.

A refinement to the arrangement shown in FIG. 1b arises when it is permissible or, as is usually the case for colorimetric reasons, desirable to introduce rejection trimming filters immediately in front of the image receptor tubes. For example, a red rejection filter in front of the blue image will reduce that bias lighting by removing the red and part of the green. A blue rejection filter in front of the red image will reduce that bias lighting by removing the blue and part of the green. A magenta rejection filter in front of the green image will reduce that bias lighting by removing the shorter wavelength blue and longer wavelength red.

The bias lighting on each image plane is then constituted as follows:

| | |
|---|---|
| Blue image plane - cyan | from source I only |
| Green image plane - desaturated magenta | from sources I and II |
| Red image plane - yellow | from source II only |

It will be seen that the features of the first arrangement are maintained and that the bias lighting arrangement is even less dependent on colour temperature of the light sources.

Although the rejection trimming filters decrease the size of the spectral windows through which the bias lighting must pass, it can be shown that the required illumination levels can easily be obtained with ample safety factor by using small tungsten filament light sources under-run to ensure long life.

Figure 2A:
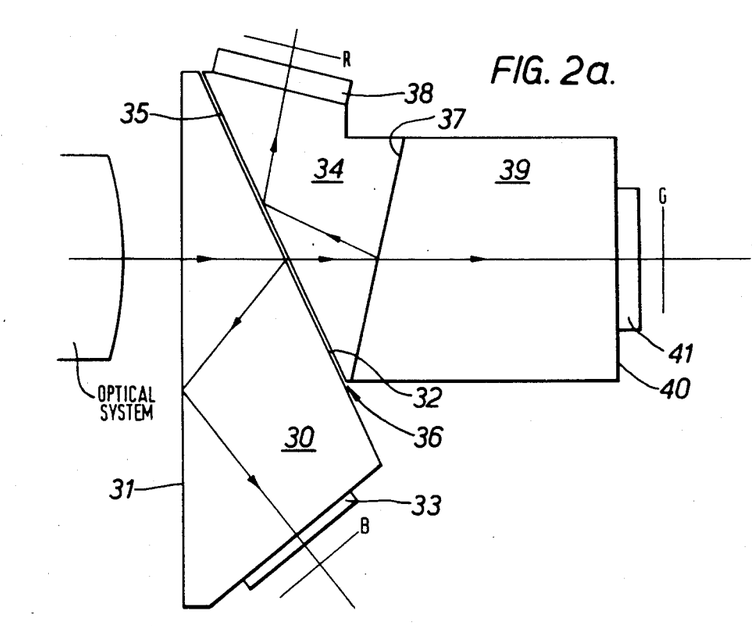

FIG. 2 shows how the invention can be applied to a colour selective beam-splitting arrangement of a prismatic type prevalently used in colour TV cameras. FIG. 2a shows the conventional geometrical layout for the purpose of splitting image-forming light in the required manner.

In FIG. 2a incident light enters a first prism 30 by a normal entry face 31. The opposing prism face 32 carries a dichroic semi-reflector which reflects the blue component which then passes by total internal reflection from the entry face 31 via a red rejection filter 33 to the blue image plane B. A second prism 34 has its entry face 35 spaced by an air gap 36 from the first prism face 32, and carries on its opposing face 37 a dichroic semi-reflector for the red component. The red component is therefore reflected at the face 37, undergoes total internal reflection at the entry face 35, and passes to the red image plane R via a blue rejection filter 38. A third prism 39 cemented to the second prism 34 at its face 37 has a normal output face 40, carrying a magenta rejection filter 41, for transmitting the green component to the green image plane G.

Figure 2B:
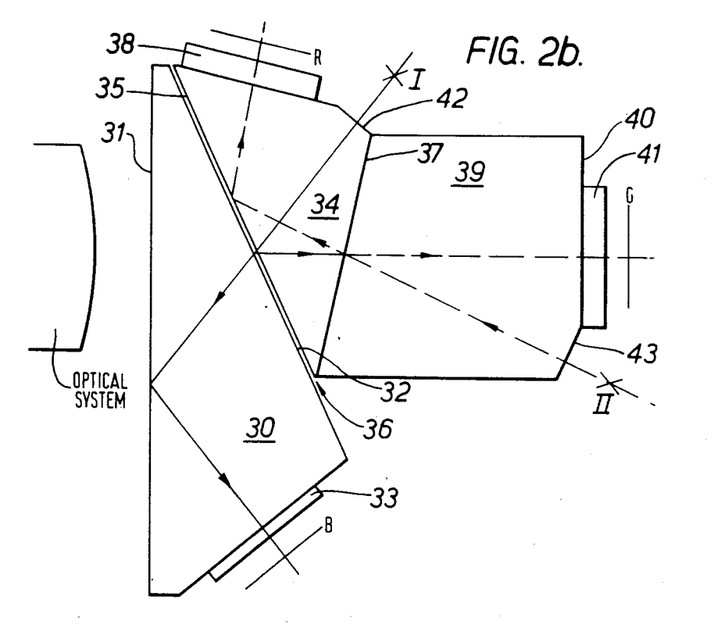
FIG. 2b shows this modified to incorporate the invention.

It has been found that when this geometry is fully optimised, the mirror image optical axes along which it is desirable that the bias light should travel pass through the outer surfaces of the prismatic assembly at areas having no function in the beam-splitting sense. FIG. 2b shows how additional small polished surfaces 42 and 43 can be provided in these areas to permit the light from bias light sources I and II to enter the prism in the required directions.

The similarity between this prismatic arrangement and the mirror arrangement of FIGS. 1a and b is immediately apparent and the previous description and comments remains the same.

Since prismatic assemblies are necessarily in close proximity to the image receptor tubes and their deflection coil assemblies, it is sometimes highly desirable to provide a more compact arrangement with the bias light sources in more convenient positions close to the prism assembly and in somewhat different locations. In this case it will be clear that the additional polished surfaces can be modified or used in conjunction with small additional prisms or mirrors to deflect the optical axes on which the bias light sources lie in more convenient directions outside the beam-splitting arrangement.

Such deflection of the optical axes outside the beam-splitting arrangement also may be used to provide additional aperture masks to prevent the bias light sources from illuminating areas of the beam-splitting prism, the focussing system or the image receptor in an undesirable manner such as to cause veiling glare or ghost images.

FIG. 3 shows how the invention can be applied to an improved prismatic, beam-splitting arrangement of the type described and claimed in our co-pending application No. 40756/71.

Figure 3A:
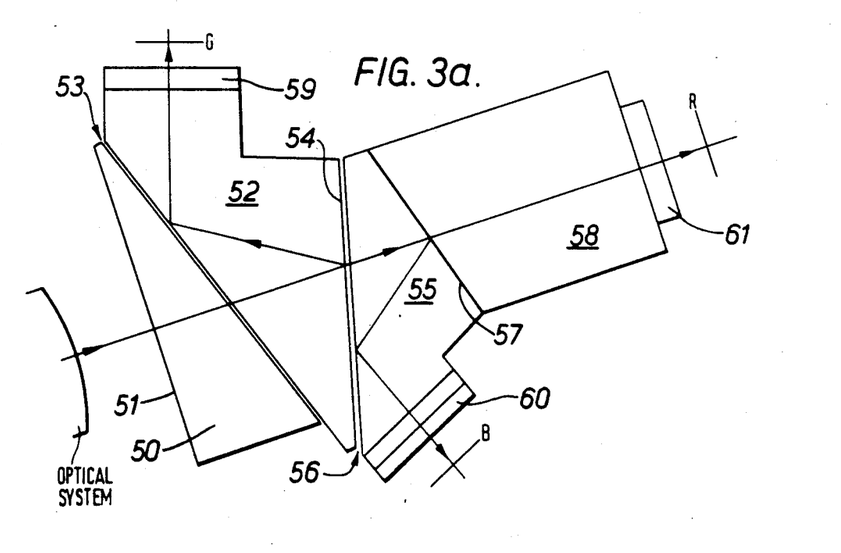
FIGS. 3a and b likewise illustrate a further beam-splitter and its modification to incorporate the invention respectively.

Briefly, one beam-splitter of this type shown in FIG. 3a comprises a first prism 50 providing a normal entry face 51, a second prism 52 separated from the first prism 50 by an air gap 53 and carrying on its rear face 54 a dichroic semi-reflector for green light, a third prism 55 separated from the second prism 52 by an air gap 56 and carrying on its rear face 57 a dichroic semi-reflector for blue light, and a fourth prism 58. Appropriate rejection filters 59, 60, 61 are provided. The principal light paths are indicated in FIG. 3a.

This case differs from the previous examples because the first channel, reflected first in the colorimetric arrangement, has spectral characteristics lying between those of the second and third in order to achieve the preferred objects of the above co-pending application.

The second, third and fourth prism elements, 52, 55 and 58, counting in the direction of the incident image forming light, are for present purposes directly analogous to the three prism elements shown in FIG. 2. The geometrical layout of the bias lighting shown in FIG. 2b is directly applicable to the four element prism arrangement and it can be made to operate in a similar manner.

Figure 3B:
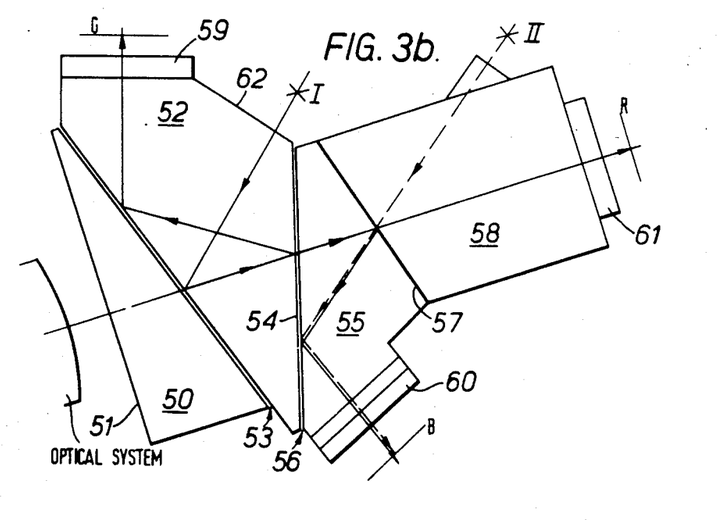

However, the spectral windows for the bias lighting described in connection with FIG. 2 operate differently because of the changed order of split and some risk of impairment of the desirable colorimetric characteristics might arise if the spectral positioning and size of the spectral windows were modified to suit, more desirably, the bias lighting requirements. This risk may only arise in some practical applications of the arrangement and may not represent significant impairment in others.

Where no impairment of colorimetric characteristics can be permitted, the invention can be applied in a different preferred manner. FIG. 3b shows how the air gap 53 between the first and second prism elements 51 and 52 can be used in conjunction with an additional entrance face 62 for introducing bias light from source I into the beam-splitting arrangement. The combined reflectance of the two glass-to-air surfaces bounding this air gap 53 is sufficient to yield the low level of bias illumination in the image planes and, after being so reflected, the bias light paths (FIG. 3b) are identical to those of the image forming light.

If the bias light source I had a high colour temperature the bias illumination in the three image planes could be matched to the required degree in the same way as the three images formed by the optical system are matched by the colorimetry of the beam-splitting arrangement.

However, since it is preferred to use under-run lamps in order to obtain wide range of adjustment and the resultant variation of lamp colour temperature would impair this bias illumination match between the image planes, a second bias light source II is incorporated which is restricted in the number of image planes which it is capable of illuminating. The geometrical arrangement of layout for this second source is again directly analogous to that described in connection with FIG. 2.

The spectral window present in the path from bias light source II to the blue image plane is similar to that described in connection with the previous examples and therefore source II provides additional bias lighting to the critical blue image when the colour temperature of source I is low. Light from source II can be prevented from reaching the red image plane, either by ensuring that the combination of reflectance from the blue reflecting dichroic mirror and rejection filter in the red channel has no spectral window or by suitable spectral filtering of light source II.

Alternatively the red and blue image plane positions can be interchanged making the dichroic mirror surface, through which light from source II first passes, red reflective instead of blue. If this dichroic mirror surface is backed by a small air gap similar to that behind the green reflecting dichroic mirror, the additional glassto-air surface will reflect sufficient light from source II to illuminate the blue image whilst absence of a spectral window in the path to the red image, or suitable filtering of source II can be incorporated to prevent any additional bias illumination from falling on the red image.

In both these alternative arrangements the voltage of source I is adjusted to set bias illumination levels for the red and green channels and source II is adjusted to provide the required matching or differential between blue and red.

The advantages of the arrangements described are:-
1. The utilisation of miniature lamp sources run at less than their rated voltage to provide a wide range of control and long life.
2. The achievement of uniformity of bias illumination at a higher level than previously available.
3. The degree of independence between the bias light paths permitting fine control of relative illumination levels in the image planes.

These will now be discussed in more detail for the arrangement of FIG. 2b. A known beam-splitting arrangement of the type shown in FIG. 2a uses Plumbicon tubes with a scanned image format having a semi diagonal of 10.7 mm and has dimensions such that modification according to FIG. 2b results in a path length from bias light sources to the image planes equivalent to 58 mm in air.

Assuming the lamp approximates to a point source, the illumination over the scanned area is given by:

$$E = \frac{I}{d^2} \cos^3 \theta$$

where E is the illumination in lux.
- $I$ is the luminous intensity in candelas in the direction associated with $\theta$.
- $d$ is the perpendicular separation of source and focal plane.
- $\theta$ is the angle between the normal to the focal plane and the direction of the source.

Considering the extreme case of a point in the corner of the picture, the field radius is 10.7 mm and:

$$\theta = \tan^{-1} \frac{10.7}{58} = 10.5°$$

$\cos^3\theta = (0.9833)^3 = 0.9507$

Hence the illumination in the corner of the field falls off to 95% of the axis value.

Two factors contribute to improve on the 5% uniformity figure. Firstly the filament of the lamp is not a true point source and its size, provided all of the filament is visible from all of the scanned area, will improve the uniformity.

Secondly the laws of refraction in the massive glass path between source and focal plane has the effect of compressing the emitted light more into the periphery of the scanned area than would have been the case with the air alone.

Hence the uniformity of illumination is within 5%.

Figure 4:
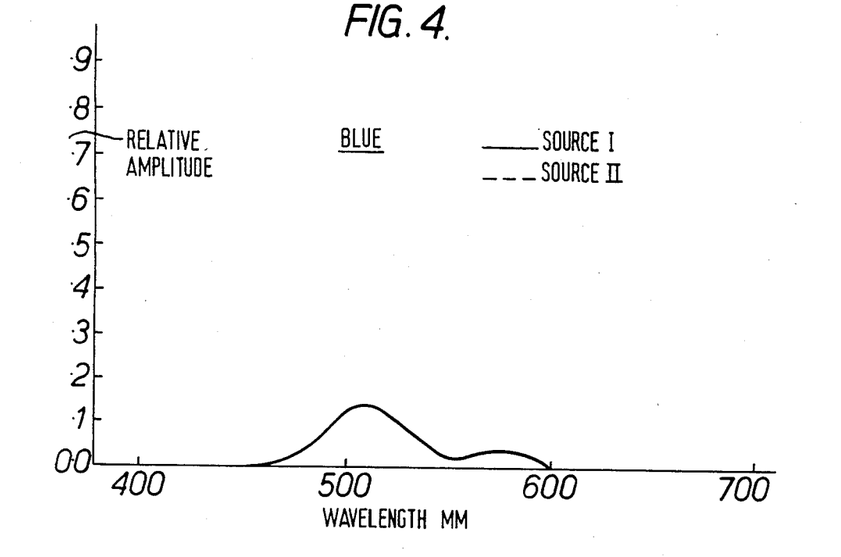
FIGS. 4, 5 and 6 show the spectral responses along the bias paths for the arrangement shown in FIG. 2b.
Figure 5:
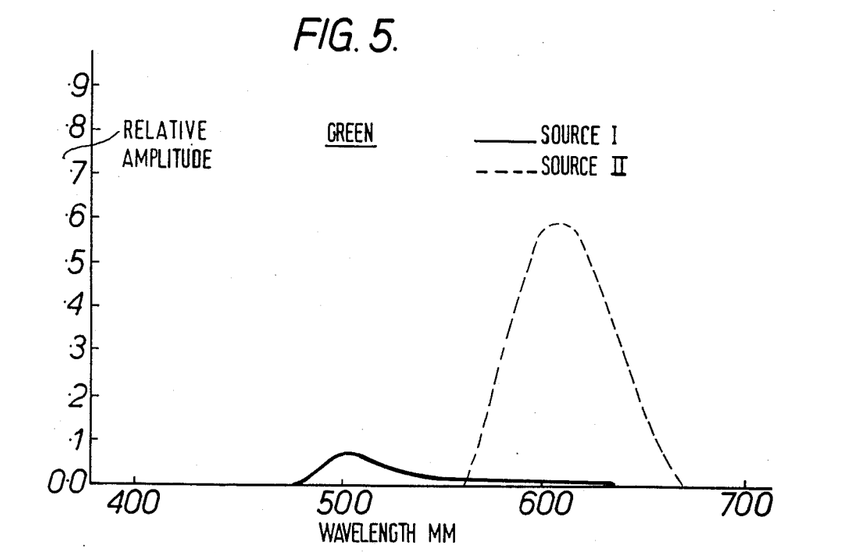
Figure 6:
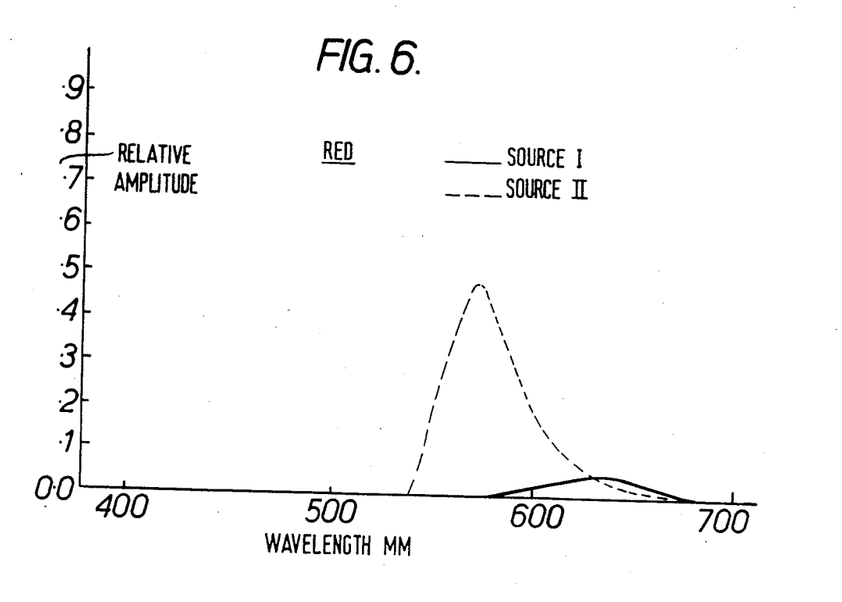

FIGS. 4, 5 and 6 show the overall spectral responses, including source emission at a typical colour temperature, spectral transmission through the beam-splitting assembly along the bias lighting paths and the Plumbicon detector response for the arrangement shown in FIG. 2b. The solid line in these figures show the overall response in each of the three channels for source I and the broken line similarly for source II.

It will be seen from FIG. 2b that it is not geometrically possible for source II to illuminate the blue channel and this accounts for the absence of a broken curve in FIG. 4. The filtering of source I when illuminating the red channel detector is obtained by combining the spectral reflection characteristics of the blue dichroic mirror 32 with the spectral transmission characteristics of the red dichroic mirror 37 and the red trimming filter 38.

The procedure is to adjust the supply to source I until the required level of bias illumination is obtained in the blue channel. This is typically proportional to the area under the curve of FIG. 4. This will simultaneously provide some illumination into the green and the red channels being typically proportional to the areas under the solid line curves of FIGS. 5 and 6 respectively. It may be shown however that these levels will be insufficient and further illumination to these two image planes must be provided by source II. These additional levels are typically proportional to the areas under the broken curves of FIGS. 5 and 6. Adjustment of source II to bring the red channel level correct, also raises that in the green to an acceptable value. Thus it may be seen that substantially independent control of the levels in the red and blue channels is possible.

The fact that the spectral windows associated with each channel differ significantly from those generated in the primary mode of operation, namely the colour separation of the image-forming light from the objective lens, is of no consequence since only the levels of illumination are significant and not its spectral content.

Suitable minature sources for bias lighting have a luminous intensity of typically 0.2 candelas, when operated at nominal voltage. In the example above, but neglecting for the moment the losses due to the filtering effects of the beam-splitting prism, this would yield a level of illumination at the axial image point given by:

$$E = \frac{0.2 \cdot 1.0}{(58 \cdot 10^{-3})^2} \approx 60 \text{ lux}$$

Over the area 12.8 × 17.1 mm scanned by the detector this would represent a total incident flux of:
12.8 · $10^{-3}$ · 17.1 · $10^{-3}$ · 60 ≈ 13 millilumens of "white" light.

By convention, the sensitivities of Plumbicon detectors are expressed in micro-amperes per lumen of "white", that is unfiltered, light. It may be shown that the sensitivity of such a detector when receiving white light filtered by characteristics shown in FIGS. 4, 5 and 6 is typically forty micro-amperes per lumen of unfiltered white light. Hence thirteen milli-lumen would yield a bias light current of 13 · $10^{-3}$ · 40 μA or 520 nA. Since only about 10 nA bias light current is generally required it will be seen that the lamps may be significantly under-run to ensure long life and wide range of voltage adjustment.

A similar situation may be established for the beam-splitting configuration shown in FIG. 3b. The different order of colour separation, in the primary sense, results in different spectral windows for the bias illumination, but the advantages of substantially independent control of the levels in the red and blue channels remain. In particular it may be shown that source II provides negligible illumination in the red channel and since it is geometrically impossible for it to illuminate the green detector, it provides illumination in the blue alone. Conversely source I may be shown to illuminate only the red and green channels.

We claim:

1. In a color-separating prism assembly having a plurality of prisms comprising a first prism for receiving an image-forming beam of incident light, a second prism, a first dichroic layer contained between the first and second prisms for reflecting one color component of the image-forming light beam, a third prism, and a second dichroic layer contained between the second and third prisms for reflecting a color component of that part of the image-forming light beam transmitted through the first dichroic layer, at least one further color component of the image-forming light beam being transmitted through the second dichroic layer, the prisms being arranged to provide at least three separated image-forming exit beams corresponding to the respective color components, and said assembly comprising means for providing bias illumination along the axes of at least all but one of the exit beams; the improvement according to which the means for providing bias illumination comprises a plurality of bias light sources, a first plane bias light entry surface formed on the third prism of the prism assembly, through which bias light from a first bias light source enters the prism assembly along an optical axis normal to said first plane surface, said optical axis intersecting the second dichroic layer at an angle which is equal and opposite to the angle between said dichroic layer and the axis of the image-forming light beam, a second plane bias light entry surface formed on one of the first and second prisms of the prism assembly, through which bias light from a second bias light source enters the prism assembly along an optical axis normal to said second plane surface, the bias light from said second bias light source being incident on the first dichroic layer, and means restricting the bias light from the first bias light source to emerge from the prism assembly along less than all the axes of the respective color component exit beams, whereby the levels of bias illumination along the respective exit beam axes can be relatively adjusted.

2. A color-separating prism assembly according to claim 1, including color filtering means whereby the bias light from the second bias light source is caused to emerge from the prism assembly along less than all the axes of the respective color-component exit beams.

3. A color-separating prism assembly according to claim 1, including color filtering means whereby the bias light from at least one of the first and second bias light sources is caused to emerge along only one of the color component exit beam axes.

4. A color-separating prism assembly according to claim 1, wherein the bias light from the second bias source is incident in succession on the first and second dichroic layers to be partially reflected and partially transmitted by each said layer.

5. A color-separating prism assembly according to claim 1, wherein the second plane bias light entry face is provided on the second prism, and the bias light from the second bias light source is incident on the first dichroic layer along the said optical axis normal to the second plane bias light entry face, said optical axis making an angle with the first dichroic layer equal and opposite to the angle between said first dichroic layer and the axis of the image-forming light beam.

6. A color-separating prism assembly according to claim 1, wherein the second plane bias light entry face is provided on the first prism, and the bias light from the second bias light source is reflected at that face of the first prism through which the image-forming light beam enters said first prism, the reflected bias light being directed along the axis of the image-forming light beam to be incident on the first dichroic layer.

7. A color-separating prism assembly according to claim 1, including an entry prism for the image-forming light beam located in front of the first prism.

* * * * *